United States Patent [19]

Lorah et al.

[11] Patent Number: 4,868,016

[45] Date of Patent: Sep. 19, 1989

[54] METHOD OF TREATING SUBSTRATES

[75] Inventors: Dennis P. Lorah, Lansdale; William A. Wood, Newtown, both of Pa.

[73] Assignee: Rohm and Haas Company, Philadelphia, Pa.

[21] Appl. No.: 159,079

[22] Filed: Feb. 23, 1988

[51] Int. Cl.$^4$ .......................... B05D 3/02; B05D 5/00
[52] U.S. Cl. ..................................... 427/287; 427/288; 427/388.4; 427/389; 427/389.7; 427/389.9; 427/393.5
[58] Field of Search .................. 427/385.5, 388.4, 287, 427/288, 389, 389.7, 389.9, 393.5; 524/501

[56] References Cited

U.S. PATENT DOCUMENTS

| | | | |
|---|---|---|---|
| 3,037,952 | 6/1962 | Jordan et al. | 524/501 |
| 4,619,960 | 10/1986 | Dodge | 524/501 X |
| 4,680,335 | 7/1987 | Chambers et al. | 524/501 |
| 4,740,536 | 4/1988 | Chao | 524/501 X |

OTHER PUBLICATIONS

K. M. O'Connor and E. B. Orler, "Morphology of Films Dried from Latexes Containing Water Soluble Polymers . . . ", Proceedings of the 14th Waterborne and Higher Solids Coatings Symposium, (Feb. 25-27, 1987), pp. 143-154.

K. M. O'Connor and S. L. Tsaur, J. of Applied Polymer Science, "Phase Rearrangement in Two Stage Emulsion Polymers . . . ", vol. 33, 2007-2027 (1987).

D. Pochan, "Morphology of Films Dried from Latexes Containing Water-Soluble Polymers . . . ", Proceedings of the 14th Waterborne and Higher Solids Coatings Symposium (Feb. 25-27, 1987), pp. 155-166.

Primary Examiner—Michael Lusignan

[57] ABSTRACT

A process is provided for applying to a substrate a polymer composition containing an alkali-soluble polymer and a latex polymer incompatible with the alkali-soluble polymer, at a weight ratio of alkali-soluble polymer to latex polymer of about 1:99 to about 80:20. The process achieves the rheological benefits of the alkali-soluble polymer in the wet state while achieving a good balance of properties in the final treated substrate.

11 Claims, No Drawings

METHOD OF TREATING SUBSTRATES

FIELD OF THE INVENTION

This invention relates to the treatment of substrates with a polymeric composition. More particularly, this invention relates to coating, printing, penetrating, or saturating of a metallic, leather, cellulosic, synthetic fabric, glass, or plastic substrate with a composition containing an aqueous latex polymer and an alkali-soluble polymer, and formulations containing such a composition, followed by heating all or part of said applied composition at a temperature sufficient to cause a phase inversion from a first state wherein the alkali-soluble polymer is the substantially continuous phase to a second state wherein the latex polymer is the substantially continuous phase.

In the field of aqueous inks, floor finishes, and coatings the use of aqueous latex and alkali-soluble polymer compositions, and formulations containing such compositions, is commonplace. It is generally accepted that the alkali-soluble polymer, present substantially in the continuous aqueous phase, contributes to the rheology and ease of application of said compositions or their formulations. However, on drying such compositions, particularly those in which the weight ratio of latex to alkali-soluble polymer is less than about 90/10, and more particularly those in which the weight ratio of latex to alkali-soluble polymer is less than about 80/20, the alkali-soluble polymer is believed to form a substantially continuous phase. In the typical case, where the alkali-soluble polymer is subjected to no subsequent chemical reaction, it can easily be attached by aqueous and, particularly, aqueous alkaline, agents within resultant damage to the composition or formulated composition. It would be desirable if the alkali-soluble polymer became substantially encapsulated in and/or surrounded by the latex portion of the composition such that the beneficial aspects of the alkali-soluble polymer were present in the liquid composition and during the treatment of the substrate, but that the deleterious aspects of the alkali-soluble polymer in the final treated substrate were substantially absent.

DESCRIPTION OF THE PRIOR ART

Mixtures or blends of alkali-soluble polymers with alkali-soluble polymers have been utilized for many years. U.S. Pat. No. 3,037,952 is typical of such technology. The benefits of ease of application and desirable rheology are attributed to the presence of the solubilized alkali-soluble polymer or alkali-soluble resin. The alkali-soluble polymer, however, becomes disposed at the surface of the treated, dried substrate rendering the surface suseptible to attack. The alkali-soluble polymer in some instances may also form a continuous phase throughout the body of the composition. As one of the properties intrinsic to an alkali-soluble polymer is solubility in an alkaline medium, the surface is susceptible to attack by alkaline agents, as, for example, ammonia or common alkaline cleaning agents.

Okubo, et el. (M. Okubo, M. Seike, and T. Matsumoto, *Journal of Applied Polymer Science,* Vol. 28, 383–390(1983)) relates to core-shell polymer technology. In this reference a polyethylacrylate shell/polystyrene core latex or a polyethylacrylate shell/poly(styrene/butylacrylate) core latex are cast into free films and heat-treated. Okubo discloses that under certain conditions a phase inversion occurs, observable via microscopy, and changes in stress-strain behavior, dynamic mechanical properties, and optical transmittance consistent with the phase inversion occur. No alkali-soluble polymers are described, nor any other component designed to effect beneficial changes in rheology of the composition in the wet state or in the facility of application in the treatment of substrates. Neither is there any teaching of the utility of the inversion process to increase the alkali-resistance of the composition.

Kast (H. Kast, *Makromol. Chem., Suppl.* 10/11, 447–461(1985) reviews the work of others, particularly that of Okubo, with core/shell latex structures and multi-domain latex particles, and concludes that morphology changes during different stages of film formation may occur with effects on the mechanical properties of the films. This does not relate, however, to latex and alkali-soluble polymer composition technology nor to a process to improve the alkali resistance properties of such a composition.

It is an object of this invention to provide a process for treatment of a substrate with a latex and alkali-soluble polymer composition which incorporates a heating to an inversion temperature step wherein the alkali-soluble polymer becomes a substantially discontinuous phase within the substantially continuous phase of the latex polymer. This process incorporates the rheological and application benefits of the alkali-soluble polymers known in the art while avoiding the negative aspects of the alkali-soluble polymer wherein it is easily attacked by aqueous or aqueous alkaline solutions.

SUMMARY OF THE INVENTION

This invention relates to a method for treating a substrate in which a latex and alkali-soluble polymer composition is prepared by combining at least one thermoplastic latex polymer which is alkali-soluble with at least one alkali-soluble polymer which is substantially incompatible with the latex polymer. The weight ratio of the latex polymer to the alkali-soluble polymer is from about 20:80 to about 99:1. The latex and alkali-soluble polymer composition or a formulation containing said composition is then applied to the substrate. The composition is then heated to an "inversion temperature" sufficient to yield a heated composition in which the alkali-soluble polymer is substantially encapsulated in and surrounded by the latex polymer.

Additionally, this invention relates a method for treating a substrate with a latex and alkali-soluble polymer composition or a formulation containing said composition, wherein at least one latex polymer has a glass transition temperature lower than about $-10°$ C. and the alkali-soluble polymer has a glass transition temperature in excess of about 30° C. Upon applying said composition and heating to a temperature sufficient to cause a phase inversion, said polymeric composition becomes tacky to the touch, and has utility as an adhesive material.

In another embodiment the substrate is treated by applying a latex and alkali-soluble polymer composition, or a formulation containing said composition, wherein at least one latex polymer has a glass transition temperature lower than about $-10°$ C. and the alkali-soluble polymer has a glass transition temperature in excess of about 30° C.. The applied composition is dried to a temperature lower than the inversion temperature of the composition to substantially remove water from the composition. The dried composition is subsequently heated to at least its inversion temperature such that said composition becomes tacky to the touch.

In another embodiment the substrate is treated by applying a latex and alkali-soluble polymer composition. The composition may be dried at a temperature below the inversion temperature to remove substantially all the water. Localized areas of the composition are then heated to a temperature sufficient to effect a phase inversion in said localized areas. The areas not so heated may optionally be contacted with an alkaline solution in order to dissolve away those areas not so heated.

DETAILED DESCRIPTION OF THE INVENTION

This invention is directed to a method for treating a substrate which comprises the preparation of a latex and alkali-soluble polymer composition by combining at least one thermoplastic latex polymer which is substantially insoluble in an aqueous alkaline medium with at least one alkali-soluble polymer which is incompatible with said thermoplastic latex polymer in a weight ratio of said thermoplastic latex polymer to said alkali-soluble polymer from about 20:80 to about 99:1.

The aqueous phase or aqueous medium is primarily water and may optionally contain ammonia or other neutralizing species, dissolved polymer, water-soluble solvents or coalescents, such as, for example, isopropanol or 2-butoxyethanol, and other formulation adjuncts, such as, for example, pigment dispersants or defoamers.

The thermoplastic latex polymer component of the composition comprises at least one thermoplastic latex polymer. "Latex polymer" as used herein refers to an aqueous dispersion of polymer particles, also referred to as an emulsion polymer, and can be prepared by methods well known in the art. Additional latex components may be used, differing, for example, in Tg, particle size, molecular weight, composition. The morphology of any of the latex polymer components, such as, for example, core/shell or multi-phase composite particles, may be selected as the application required. "Thermoplastic" refers to a latex which is not so highly crosslinked that the subsequent phase inversion step of this process can not occur. However, it does not preclude low levels of adventitious or deliberate crosslinking, as may be achieved by incorporation of low levels of multiple ethylenically unsaturated monomers into the latex component, such low levels in some instances facilitating polymer branching rather than leading to a substantially infinite network.

Suitable monomers for preparing the thermoplastic latex polymer component include methyl acrylate, ethyl acrylate, butyl acrylate, 2-ethylhexyl acrylate, decyl acrylate, methyl methacrylate, ethyl methacrylate, acrylic acid, methacrylic acid, itaconic acid, maleic acid, fumaric acid, styrene, substituted styrenes, butadiene, acrylonitrile, vinyl acetate, other $C_1$-$C_{12}$ alkyl acrylates and methacrylates, and the like. It is preferred that a low level of acid-containing monomer such as, for example, about 0.5 to about 3.0% by weight, based on the weight of the latex monomer mixture, be incorporated into the latex component of the composition. Low levels of acid are beneficial to the stability of the latex component and the facility of the latex component syntheses, regardless of how it is prepared.

Chain transfer agents including mercaptans, polymercaptans, and polyhalogen compounds are sometimes desirable in the polymerization mixture in order to moderate the molecular weight of the thermoplastic latex polymer component. Preferred chain transfer agents include, for example, mercaptopropionic acid and its esters, mercaptoacetic acid and its esters, and $C_4$-$C_{20}$ alkyl mercaptans. Generally from about 0 to about 3% by weight, based on the weight of the latex monomer mixture, may be used.

The alkali-soluble polymer component of the composition contains at least one polymer soluble in aqueous alkaline solution. Additional alkali-soluble polymers may also be used, differing in Tg, molecular weight, composition, and the like.

Suitable monomers for preparing the alkali-soluble polymer are methyl acrylate, ethyl acrylate, butyl acrylate, 2-ethylhexyl acrylate, decyl acrylate, methyl methacrylate, ethyl methacrylate, acrylic acid, methacrylic acid, itaconic acid, maleic acid, fumaric acid, stryene, substituted styrenes, acrylonitrile, vinyl acetate, other $C_1$-$C_{12}$ alkyl acrylates and methacrylates, and the like. The acid-containing monomer incorporated in the alkali-soluble polymer is preferably included at a level of about 10 to about 60% by weight of the alkali-soluble polymer.

Chain transfer agents including mercaptans, polymercaptans, and polyhalogen compounds are preferred in the polymerization mixture in order to moderate the molecular weight of the alkali-soluble polymer component. Preferred chain transfer agents include, for example, mercaptopropionic acid and its esters, mercaptoacetic acid and its esters, and $C_4$-$C_{20}$ alkyl mercaptans. Generally from about 0 to about 8% by weight, based on the weight of the alkali-soluble polymer, may be used.

The weight ratio of the thermoplastic latex polymer component to the alkali-soluble polymer component is from about 20:80 to about 99:1, preferably from about 40:60 to about 90:10.

The latex and alkali-soluble polymer composition may be formulated with conventional components such as, for example, pigments, dispersants, surfactants, coalescents, wetting agents, rheology modifiers, thickeners, drying retarders, biocides, anti-foaming agents, colorants, waxes, and the like, as is appropriate for the specific application.

The preparation of the latex and alkali-soluble polymer composition can be achieved by various methods. The simplest method is via admixing the alkali-soluble polymer with a thermoplastic latex polymer. This admixing is most beneficially accomplished with both components having been neutralized to a pH higher than about pH 7 to minimize the possibility of coagulating the latex on mixing the two components; additionally, it is desirable that the alkali-soluble polymer is at least partially dissolved in aqueous solution to achieve the beneficial effects of said polymer.

Alternatively, the composition can be prepared at a pH lower than about pH 7 by the use of core-shell emulsion polymerization technology, wherein the composition has an alkali-insoluble, emulsion polymer core and an alkali-soluble emulsion polymer shell attached to or associated with said core. This core-shell technology in known in the art as by U.S. patent application Ser. No. 634,333; the disclosure of this process is herein incorporated by reference. At pH higher than about pH 7, depending on composition, sufficient to dissolve said shell composition, the shell polymer is partially dissolved in the aqueous medium with a portion of said shell remaining attached to or associated with said core.

Alternatively, the composition can be prepared by emulsion polymerizing the latex polymer in the present of a solubilized alkali-soluble polymer to yield a composition with some of the alkali-soluble polymer in solution, depending on the pH of the aqueous medium, and with a portion of the alkali-soluble polymer attached to or associated with said latex polymer.

In these and other approaches to preparing the latex and alkali-soluble polymer composition the latex is insoluble in the alkaline medium and the alkali-soluble polymer may be partially or substantially totally dissolved in the aqueous medium. The undissolved alkali-soluble polymer is attached to, adsorbed onto, associated with, or bonded to the latex particle. In preferred embodiments of the invention, the latex and alkali-soluble polymer composition is at a pH sufficiently high so that a substantial portion of the alkali-soluble polymer is solubilized. This is believed to contribute to the viscosity and is instrumental in providing the beneficial rheological properties and the ease of application in the wet state.

Applying the latex and alkali-soluble polymer composition or a formulation containing said composition to the substrate is a step of the treatment process. Methods of application include coating, penetrating, saturating, printing, and the like. Preferred application methods include for example, coating via direct roll coaters, printing presses, and the like, where control of the rheology is an important aspect of the application. These applications benefit from the use of the alkali-soluble polymer component of the composition in the wet state. Suitable substrates include paper, wood, metal, plastic, textiles, glass, leather and the like.

After applying the composition to the substrate, the composition, but not necessarily the substrate, is heated to an inversion temperature. As used herein, "inversion temperature" is a temperature sufficient to yield a polymeric system in which at least one of said thermoplastic latex polymers forms a substantially continuous phase, containing therein a multiplicity of discrete domains of said alkali-soluble polymer(s). The composition may be dried to volatilize some or all of the aqueous phase prior to final heating to the inversion temperature. This drying can be accomplished by heating to a temperature lower than the inversion temperature or the drying can occur concurrently with the heating to the inversion temperature or a higher temperature. By heating the composition to the inversion temperature a phase inversion occurs such that said alkali-soluble polymer becomes surrounded by or encapsulated by the thermoplastic latex polymer component of the composition, thereby becoming essentially isolated from external chemical agents.

The inversion temperature or phase inversion temperature of a latex and alkali-soluble polymer composition of this invention is not as specific as, for example, the melting point temperature of a crystalline compound. The inversion temperature of the composition is believed to be related to the mobility of the polymers contained in the composition and is affected by the latex molecular weight, Tg, and particle size; it is also affected by the alkali-soluble polymer molecular weight and Tg, as well as by the weight ratio of the latex to alkali-soluble polymer. The relationship of the inversion temperature to these and other basic polymer parameters is not a simple one.

As with other transitions involving polymer flow and mobility, there is a time factor involved in substantially completing such a transition. At a higher temperature, polymer mobility is generally higher and the inversion is effected more rapidly. At a lower temperature, the inversion of the same composite will generally be effected more slowly. At a still lower temperature, the transition will not be effected on a practical time scale; and such a temperature is defined herein as being below the inversion temperature. The practical time scale will differ depending on the application desired. For example, the practical time scale for production line coating of sheets of wooden panelling may be one minute if the handling and stacking properties of the treated sheets are affected by the phase inversion. Alternatively, for example, a phase inversion designed to effect primarily the ammonia resistance of a painted plastic article may have a practical time scale of a week, if the transition occurs at ambient temperature and the article is not put into service before that time. The time-temperature factor involved in the phase inversion for specific compositions is exemplified hereinafter.

There are three ways by which one skilled in the art can determine when a phase invention of a thermoplastic latex and alkali-soluble polymer composition has occurred. Firstly, when a dried film of the composition has been formed, particularly when the composition contains 30% or more alkali-soluble polymer(s) by weight, based on composition weight, when the alkali-soluble polymer has a Tg higher than about 30° C., and when the thermoplastic latex component of the composition has a Tg lower than about $-10°$ C., said dried film will not be tacky to the touch at 25° C.. When the composition has been heated to at least the phase inversion temperature, and allowed to cool back down to 25° C., said dried, heated film will be tacky to the touch at 25° C.

Secondly, when a dried film of the composition has been formed and it is contacted with a base, for example, selected from the group consisting of ammonia, triethylamine, monoethylamine, and dimethylaminoethanol, the film will exhibit a visible effect, such as, for example, swelling, partial dissolution, or hazing. Further, said film will exhibit marring or disruption on rubbing with a piece of cloth in the contacted area. When the composition has been heated to at least the phase inversion temperature and the film is contacted with a base in the same manner as previously, the visible effects or the marring or disruption of said film will be reduced or absent.

Thirdly, when a dried film of the composition has been formed, it can be examined by a technique known to those skilled in the art as transmission electron microscopy (TEM). In this technique, the polymeric components of the composition are differentially stained so that one phase is visible in a TEM micrograph. For example, the alkali-soluble polymer component was stained by techniques known in the art without staining the thermoplastic latex polymer component. Said stained alkali-soluble polymer appeared as a substantially continuous phase, particularly when the level of alkali-soluble polymer component was greater than about 30% by weight, based on the weight of the composition. When a dried film of the composition was formed as above and the composition was heated to at least the phase inversion temperature, stained as previously, and subjected to TEM examination, a micrograph showed that the stained alkali-soluble polymer component was now present as a multiplicity of discrete domains surrounded by the thermoplastic latex component.

The object of this invention is to provide the benefits of the alkali-soluble polymer of the composition in the wet state, namely the rheological properties, and during the step of applying the composition to the substrate, as relates to rheology and ease of application, for example, and, in some instances in the latter stages of said application, as in the flow and levelling of an applied coating formulation. The alkali-soluble polymer is present substantially dissolved in the aqueous solution and/or attached to, adsorbed on, or associated with the latex polymer surface and forms a continuous phase on drying at a temperature lower than the phase inversion temperature, most suseptible to attack by externally applied chemical agents if the weight ratio of latex polymer(s) to alkali-soluble polymer(s) is less than about 70:30. However, the alkali-soluble polymer is also believed to form an essentially continuous phase susceptible to attack by externally applied chemical agents if the weight ratio of latex polymer(s) to alkali-soluble polymer(s) is less than about 90:10 and the latex polymer is easily deformable, that is, when the latex polymer Tg is below the temperature of drying of the composition, wherein said drying temperature is lower than the phase inversion temperature. Even when the weight ratio of latex polymer(s) to alkali-soluble polymer(s) is less than about 99:1, and the composition is dried at a temperature lower than the phase inversion temperature, the alkali-soluble polymer is believed to be easily accessible to externally applied chemical agents especially alkaline solutions, such as, for example, ammonia, Chlorox ®, or trisodium phosphate cleaning solution, so that the film of the composition can be disrupted by such agents. Another object of this invention is to further heat the composition to a phase inversion temperature so that said alkali-soluble polymer becomes a substantially discontinuous phase, relatively protected by said latex polymer phase from attack by chemical agents.

The following examples are intended to illustrate the method of treating a substrate to which this invention is directed. They are not intended to limit the invention as other applications of the invention will be obvious to those of ordinary skill in the art.

EXAMPLE 1

Preparation of thermoplastic latex and alkali-soluble polymer composition

Preparation of Sample 1. A stirred reactor containing 735 g. of deionized (DI) water, 3.30 g. sodium lauryl sulfate, and 2.75 g. sodium acetate trihydrate was heated to 81° C. under nitrogen. Next, 40 g. of monomer emulsion (ME) #1 listed in Table 1.1 below was added to the reactor, followed by 1.1 g. of ammonium persulfate Dissolved in 28 g. of DI water. After 19 minutes, the remainder of ME #1 was added slowly to the reactor over a 135 minute period, along with Cofeed #1 listed in Table 1.2, while maintaining a reactor temperature of about 81° C.. After a 30 minute hold period at 81° C., ME #2 (listed in Table 1.1) was added slowly to the reactor over a 45 minute period while Cofeed #2 (listed in Table 1.2) was added over a 75 minute period. A reaction temperature of about 81° C. was maintained throughout these additions.

The final product had a solids content of 40 wt. %, Brookfield viscosity of 22 cps., and a pH of 4.2.

TABLE 1.1

| Monomer Emulsions for Example 1 (all quantities in g.) | | |
|---|---|---|
| | ME #1 | ME #2 |
| DI water | 270 | 90 |
| Sodium Lauryl Sulfate | 8.25 | 1.38 |
| Butyl Acrylate | 618.8 | — |
| Methyl Methacrylate | 202.1 | 220 |
| Methacrylic Acid | 4.1 | 55 |
| n-Dodecylmercaptan | — | 16.5 |

TABLE 1.2

| Cofeed Solutions for Example 1 (all quantities in g.) | | |
|---|---|---|
| | Cofeed #1 | Cofeed #2 |
| DI water | 160 | 90 |
| Ammonium Persulfate | 1.95 | 1.10 |

EXAMPLE 2

Preparation of a thermoplastic latex and alkali-soluble polymer composition

Sample 2A was prepared according to the procedure of Example 1 with the exceptions that ME #1 and Cofeed #1 were added over a period of 90 minutes, ME #2 was added over a period of 90 minutes, and Cofeed #2 was added over a period of 120 minutes. Monomer emulsion and Cofeed compositions are presented in Tables 2.1 and 2.2 below.

TABLE 2.1

| Monomer Emulsions for Example 2 (all quantities in g.) | | |
|---|---|---|
| | ME #1 | ME #2 |
| DI water | 180 | 180 |
| Sodium Lauryl Sulfate | 5.5 | 2.75 |
| Butyl Acrylate | 412.5 | — |
| Methyl Methacrylate | 134.8 | 440 |
| Methacrylic Acid | 2.7 | 110 |
| n-Dodecyl Mercaptan | — | 33 |

TABLE 2.2

| Cofeed Solutions for Example 2 (all quantities in g.) | | |
|---|---|---|
| | Cofeed #1 | Cofeed #2 |
| DI water | 110 | 180 |
| Ammonium Persulfate | 1.3 | 2.2 |

EXAMPLE 3

Preparation of a thermoplastic latex and alkali-soluble polymer composition

Sample 2B was prepared according to the procedure of Example 1 with the following exceptions. ME #1 and Cofeed #1 were added over a period of 120 minutes. ME #2 was added over a period of 20 minutes. Cofeed #2 was added over a period of 50 minutes. Monomer emulsion and Cofeed compositions are presented below.

TABLE 3.1

| Monomer Emulsions for Example 3 (all quantities in g.) | | |
|---|---|---|
| | ME #1 | ME #2 |
| DI water | 320 | 45 |
| Sodium Lauryl Sulfate | 9.68 | 0.66 |
| Butyl Acrylate | 726 | — |
| Methyl Methacrylate | 237.2 | 105.6 |
| Methacrylic Acid | 4.8 | 26.4 |
| n-Dodecyl Mercaptan | — | 7.92 |

TABLE 3.2

| Cofeed Solution for Example 3 (all quantities in g.) | | |
|---|---|---|
| | Cofeed #1 | Cofeed #2 |
| DI water | 180 | 45 |
| Ammonium Persulfate | 2.3 | 0.53 |

EXAMPLE 4

Preparation of other thermoplastic latex and alkali-soluble polymer compositions Samples 2C–2H and 2J were prepared according to the procedure of Example 1 with the exception that the monomer emulsion, ME #1 and ME #2, compositions were as presented in Table 4. Cofeeds and all other aspect were identical to Example 1.

TABLE 4

Monomer Emulsions for Examples 2C–2H AND 2J (all quantities in g.)

| | MONOMER EMULSION #1 (ME #1) | | | | | | |
|---|---|---|---|---|---|---|---|
| Sample | 2C | 2D | 2E | 2F | 2G | 2H | 2J |
| DI water | 270 | 270 | 270 | 270 | 270 | 270 | 270 |
| Sodium Lauryl Sulfate | 8.25 | 8.25 | 8.25 | 8.25 | 8.25 | 8.25 | 8.25 |
| Butyl Acrylate | 618.8 | 618.8 | 618.8 | 618.8 | 820.9 | 618.8 | 618.8 |
| Methyl Methacrylate | 202.1 | 202.1 | 202.1 | 202.1 | — | 202.1 | 202.1 |
| Methacrylic Acid | 4.1 | 4.1 | 4.1 | 4.1 | 4.1 | 4.1 | 4.1 |
| n-Dodecyl Mercaptan | 2.48 | 4.12 | 12.3 | — | — | — | 12.3 |
| Alkyl Methacrylate | — | — | — | — | — | 2.48 | 2.48 |
| | MONOMER EMULSION #2 (ME #2) | | | | | | |
| DI water | 90 | 90 | 90 | 90 | 90 | 90 | 90 |
| Sodium Lauryl Sulfate | 1.38 | 1.38 | 1.38 | 1.38 | 1.38 | 1.38 | 1.38 |
| Butyl Acrylate | — | — | — | 55 | — | — | — |
| Methyl Methacrylate | 220 | 220 | 220 | 165 | 220 | 220 | 220 |
| Methacrylic Acid | 55 | 55 | 55 | 55 | 55 | 55 | 55 |
| n-Dodecyl Mercaptan | 16.5 | 16.5 | 16.5 | 16.5 | 16.5 | 16.5 | 16.5 |

EXAMPLE 5

Preparation of latex and alkali-soluble polymer composition

In this example the composition, Sample 2I, was prepared by polymerizing the latex polymer component in the presence of fully neutralized, i.e., solubilized, alkali-soluble polymer. The technique used is described in British Pat. No. 1,107,249, Example 22 (beginning on page 31, line 7). The ingredients listed in Table 5 were used in this preparation.

TABLE 5

| Components Used in Preparation of Sample 2I (quantities in g.) | |
|---|---|
| Commercial ASP[1] | 450 |
| Aqueous NH$_3$(28%) | 105 |
| Ammonium Persulfate | 12.6 |
| 2-Ethylhexyl Acrylate | 877.5 |
| Methyl Methacrylate | 472.5 |
| Non-ionic Surfactant | 54 |
| DI water | Sufficient to maintain viscosity below 500 cps. |

[1]Commercial ASP - Commercially available alkali-soluble polymer(ASP) used was Joncryl ® 678 from S. C. Johnson & Co.

Compositions of all Samples are summarized in Table 6

LATEX ALKALI-SOLUBLE POLYMER COMPOSITIONS

| | THERMOPLASTIC LATEX COMPONENT | | | | | ALKALI-SOLUBLE POLYMER COMPONENT | | | | |
|---|---|---|---|---|---|---|---|---|---|---|
| SAMPLE | % BA | % MMA | % MAA | %DDM | | % of Total Composition | % MMA | % MAA | % DDM | % BA | % of Total Composition |
| 1 | 75 | 24.5 | 0.5 | — | | 75 | 80 | 20 | 6 | | 25 |
| 2A | 75 | 24.5 | 0.5 | — | | 50 | 80 | 20 | 6 | | 25 |
| 2B | 75 | 24.5 | 0.5 | — | | 88 | 80 | 20 | 6 | | 25 |
| 2C | 75 | 24.5 | 0.5 | 0.3 | | 75 | 80 | 20 | 6 | | 25 |
| 2D | 75 | 24.5 | 0.5 | 0.5 | | 75 | 80 | 20 | 6 | | 25 |
| 2E | 75 | 24.5 | 0.5 | 1.5 | | 75 | 80 | 20 | 6 | | 25 |
| 2F | 75 | 24.5 | 0.5 | — | | 75 | 60 | 20 | 6 | 20 | 25 |
| 2G | 99.5 | — | 0.5 | — | | 75 | 80 | 20 | 6 | | 25 |
| 2H | 75 | 24.5 | 0.5 | — | ALMA 0.3 | 75 | 80 | 20 | 6 | | 25 |
| 2I | — | 35 | — | — | 2-EHA 65 | 75 | Commercial ASP | | | | 25 |
| 2J | 75 | 24.5 | 0.5 | 1.5 | ALMA 0.3 | 75 | 80 | 20 | 6 | | 25 |

All % ARE IN WT. %
BA butyl acrylate
MMA methyl methacrylate
MAA methacrylic acid
ALMA alkyl methacrylate
2-EHA 2-ethylhexylacrylate
Commercial ASP Joncryl ® 678 from S. C. Johnson Co.
DDM n-dodecyl mercaptan

EXAMPLE 6

Effect of latex/alkali-soluble ratio on phase inversion.

TABLE 7

| | | Effect of Latex/Alkali-soluble Polymer(ASP) Ratio on Phase Inversion | | | | | | | | |
|---|---|---|---|---|---|---|---|---|---|---|
| | | TIME IN MINUTES AT 325° C. | | | | | | | | |
| | | 1 | | 5 | | 10 | | 15 | 23 | |
| SAM-PLE | LATEX/ASP RATIO | NH3 RESIST | TACK RATING | NH3 RESIST | TACK RATING | NH3 RESIST | TACK RATING | NH3 RESIST | TACK RATING | NH3 RE-SIST | TACK RATING |
| 2A | 50/50 | 1 | 1 | 1 | 1 | 1 | 1 | 8 | 1 | 8 | 1 |
| 1 | 75/25(1) | 1 | 1 | 3 | 1 | 8 | 5 | 9 | 6 | 9 | 9 |
| 2B | 88/12 | 1 | 1 | 8 | 2 | 9 | 5 | 9 | 7 | 9 | 6 |

Samples were neutralized to about pH 8 with 28% aqueous ammonia and cast onto 3.25"×4"projector slide cover glasses and dried at ambient temperature before placement in a high velocity, horozonial air flow oven for the times shown.

Tack to the finger touch was rated with the film at ambient laboratory conditions on a scale from 0 (no tack) to 10 (very very tacky). Ammonia resistance was rated after 30 minute contact of a 10% aqueous NH3 solution with the film at ambient laboratory conditions on a scale from 0 (complete dissolution) to 10 (no effect).

In the data shown in Table 7 the phase inversion was monitored for degree of completion at a fixed temperature as a function of time. On a time scale of 10–15 minutes Sample 2B exhibited a phase inversion temperature of 325° F. On a time scale of 15 minutes Sample 1 exhibited a phase inversion temperature of 325° F. On a time scale of 33 minutes Sample 2A exhibited a useful level of development of ammonia resistance but tack development was incomplete; the phase inversion temperature was in excess of 325° F. The phase inversion temperature increased with increasing level of alkali-soluble polymer in the composite on a fixed time scale. Alternatively, the time scale for the phase inversion to occur at a fixed temperature increased with increasing level of alkali-soluble polymer.

EXAMPLE 7

Effect of alkali-soluble polymer MW

Samples were prepared as described in Examples 1 and 4. The test procedure was described in Example 6.

TABLE 8

Effect of Alkali-soluble Polymer MW on Phase Inversion Rate at 300° F.

| Sample | 1 | 2C | 2D | 2E |
|---|---|---|---|---|
| % Chain Transfer Agent in Alkali-soluble Polymer Preparation | 0 | 0.3 | 0.5 | 1.5 |
| MW | — | 200,000 | 120,000 | 40,000 |
| Time(min.) at 300° F. to attain an ammonia resistance rating of 7 | 60 | 4 | 3.5 | 3.5 |

On a time scale of 3.5–4 minutes the phase inversion of Samples 2C, 2D, and 2E was 300° F.. Decreasing the MW of the alkali-soluble polymer relative to Sample 1 resulted in a shorter time scale being required to effect the phase inversion.

EXAMPLE 8

Effect of alkali-soluble polymer Tg on Phase Inversion

Sample preparation was described in Examples 1 and 4. Samples were neutralized to about pH 8 with 28% aqueous ammonia before casting on glass lantern slides. Test procedures were described in Example 6.

TABLE 9

Effect of Alkali-soluble Polymer(ASP) Tg on Phase Inversion

| Sample | 1 | 2F |
|---|---|---|
| Calc.Tg(°C.) for ASP | 110 | 85 |

| Time (minutes) at 325 F. | NH3 RESIST RATING | TACK RATING | NH3 RESIST RATING | TACK RATING |
|---|---|---|---|---|
| 1 | 1 | 1 | 1 | 1 |
| 2 | — | — | 3 | 1 |
| 5 | 3 | 1 | 7 | 8 |

Decreasing the Tg of the alkali-soluble polymer decreased the time scale of the phase inversion at 325° F. In Sample 2F on a time scale of five minutes the phase inversion temperature was 325° F., while the phase inversion temperature of Sample 1 was higher than 325° F. on the same time scale.

EXAMPLE 9

Effect of Thermoplastic Latext Polymer Tg on Phase Inversion

Sample preparation was described in Examples 1 and 5. Samples were neutralized to about pH 8 with 28% aqueous ammonia before casting on glass slides. Test methods were described in Example 6.

TABLE 10

Effect of Thermoplastic Latex Polymer Tg on Phase Inversion

| Sample | 1 | 2G |
|---|---|---|
| Latex Polymer Calc. Tg | −13° C. | −40° C. |

| Time (minutes) at 325 F. | NH3 RESIST RATING | TACK RATING | NH3 RESIST RATING | TACK RATING |
|---|---|---|---|---|
| 1 | 1 | 1 | 1 | 1 |
| 5 | 3 | 1 | 1 | 2 |
| 10 | 8 | 5 | 8.5 | 9 |
| 30–35 | 9 | 7 | 9 | 9 |

The time scale of the phase inversion for Sample 1 at 325° F. was about 30 minutes. At a lower thermoplastic latex polymer Tg, Sample 2G exhibited a time scale of about 10 minutes to effect the same phase inversion at a temperature of 325° F.

EXAMPLE 10

Effect of Light Crosslinking/Branching of Thermoplastic Latex Polymer

Sample preparation was described in Tables 1 and 4. Samples were neutralized to about pH 8 prior to casting on glass slides. Test methods were as described in Example 6.

TABLE 11

Effect of Light Crosslinking/Branching of Thermoplastic Latex Polymer on Phase Inversion

| Sample | | | 1 | 2H |
|---|---|---|---|---|
| Wt. % Allyl Methacrylate in Latex Polymer Prep. | | | 0 | 0.3 |
| Time (minutes) at 325 F. | NH3 RESIST RATING | TACK RATING | NH3 RESIST RATING | TACK RATING |
| 1 | 1 | 1 | 1 | 1 |
| 5 | 3 | 1 | 8 | 3 |
| 10 | 8 | 5 | 8.5 | 9 |

A low level of a graft-linking monomer was included in the preparation of the thermoplastic latex polymer and is believed to lead to polymer branching. A high level may lead to true crosslinking and inhibit the phase inversion via limiting the mobility of the phases. The low level of allyl methacrylate in Sample 2H facilitated the phase inversion. On a time scale of 10 minutes the phase inversion of Sample 1 was not quite complete, i.e., the phase inversion temperature was in excess of 325° F. The phase inversion of Sample 2H was 325° F. on a time scale of 10 minutes.

EXAMPLE 11

Effect of Coalescent Addition on Phase Inversion

Sample preparation was described in Example 5. Samples were neutralized to about pH 8 with 28% aqueous ammonia prior to casting on glass slides. Test methods were described in Example 6. The butyl ether of diethylene glycol (Union Carbide's Butyl Carbitol ®) was added to a thermoplastic latex polymer and alkali-soluble polymer composite as a coalescent.

TABLE 12

Effect of Coalescent Addition on Phase Inversion

| Sample | | | 2I | 2I |
|---|---|---|---|---|
| Wt. % Butyl Carbitol ® based on Composite Solids | | | 0 | 30 |
| Time (minutes) at 300 F. | NH3 RESIST RATING | TACK RATING | NH3 RESIST RATING | TACK RATING |
| 1 | 1 | 1 | 8 | 5 |
| 2 | 4 | 1 | 9 | 2 |
| 3 | 7 | 2 | 9+ | 9+ |

Addition of a coalescent to a dispersed polymer system is believed to temporarily plasticize the polymer phase and facilitate film formation. In this example, it is believed that the increased mobility of the coalesced polymer led to a shortening of the time scale on which the phase inversion occurred relative to the sample without coalescent at a temperature of 300° F.

EXAMPLE 12

Phase Inversion of Clear Adhesive Coating

To 40 g. of Sample 2J was added 3.2 g. of 28% aqueous ammonia solution to neutralize the sample to about pH 8; 6.7 g. of a 50% by wt. solution of 2-butoxyethanol in water was then added with stirring. The low shear Brookfield viscosity was 62 cps. and the high shear ICI viscosity was 30 cps.. The Rheology Index (R.I.) which is the ratio of the ICI to the Brookfield viscosity was equal to 0.48, which indicated a desirable rheology for roll coating applications. A typical latex so formulated (Rhoplex AC-261 from Rohm & Haas Company) yielded a R.I.=0.21.

A film of formulated Sample 2J as described above was drawn down on glass and allowed to dry.

TABLE 13

Phase Inversion of Clear Adhesive Coating

| | NH3 Resist. Rating | Tack Rating |
|---|---|---|
| Dried film of Sample 2J | 0 | 0 |
| Film of formulated Sample 2J heated 5 min. at 250° F. | 9 | 7 |

The formulated clear coating of Sample 2J exhibited a desirable rheology and exhibited a phase inversion to a tacky adhesive material on heating to a phase inversion temperature of 250° F. on a time scale of 5 minutes.

EXAMPLE 13

Phase Inversion in Localized Areas

A film of Sample 2I, described in Example 5, was applied to a glass lantern slide with a #32 wire wound rod and dried briefly (1 minute in a 300° F. oven). The film was hard to the touch. A first half of the film was covered with a wooden panel and the second half of the film was heated with a hot air gun. After the entire coated slide had cooled to room temperature, the heated second half of the film was tacky to the touch while the masked first half of the film was still hard to the touch. Portions of both halves of the film were contacted with 10% aqueous ammonia solution for 30 minutes. The film on the first half was wiped off the glass slide along with the ammonia when the ammonia was removed with a paper tissue. The film on the second half was treated identically and the film was intact.

What is claimed is:

1. A method for treating a substrate comprising:
 (a) forming a composition by combining at least one thermoplastic latex polymer which is substantially insoluble in an aqueous alkaline medium with at least one alkali-soluble polymer which is incompatible with said thermoplastic latex polymer in a weight ratio of said thermoplastic latex polymer in said alkali-soluble polymer from about 20 to 80 to about 99 to 1;
 (b) applying said composition to said substrate; and
 (c) heating said composition to an inversion temperature.

2. The method of claim 1 wherein said weight ratio of said thermoplastic latex polymer to said alkali-soluble polymer is from about 40 to 60 to about 90 to 10.

3. The method of claim 1 wherein said first polymer has a weight average molecular weight of from about 10,000 to about 2,000,000.

4. The method of claim 2 wherein said first polymer has a glass transition temperature lower than about −10° C.

5. The method of claim 1 wherein said second polymer has a weight average molecular weight of from about 1000 to about 100,000.

6. The method of claim 1 wherein said composition is neutralized to a pH greater than about pH 7 prior to step (b) by adding a base selected from the group consisting of ammonia, triethylamine, monoethylamine, and dimethylaminoethanol.

7. The method of claim 1 wherein heating said applied composition to a temperature lower than said inversion temperature to substantially remove water is carried out prior to step (c).

8. The method of claims 1 or 7 wherein said heating step (c) comprises heating localized areas of said composition to at least said inversion temperature.

9. The method of claim 8 further comprising contacting said composition by applying an alkaline solution.

10. The method of claim 1 wherein said applying step (b) comprises applying said composition as a coating on said substrate.

11. The method of claim 1 wherein said applying step (b) comprises applying said composition as an ink on said substrate.

* * * * *